Dec. 28, 1926.　　　W. C. STEVENS　　　1,612,786
COLLAPSIBLE TIRE CORE
Filed April 7, 1923　　　3 Sheets-Sheet 1
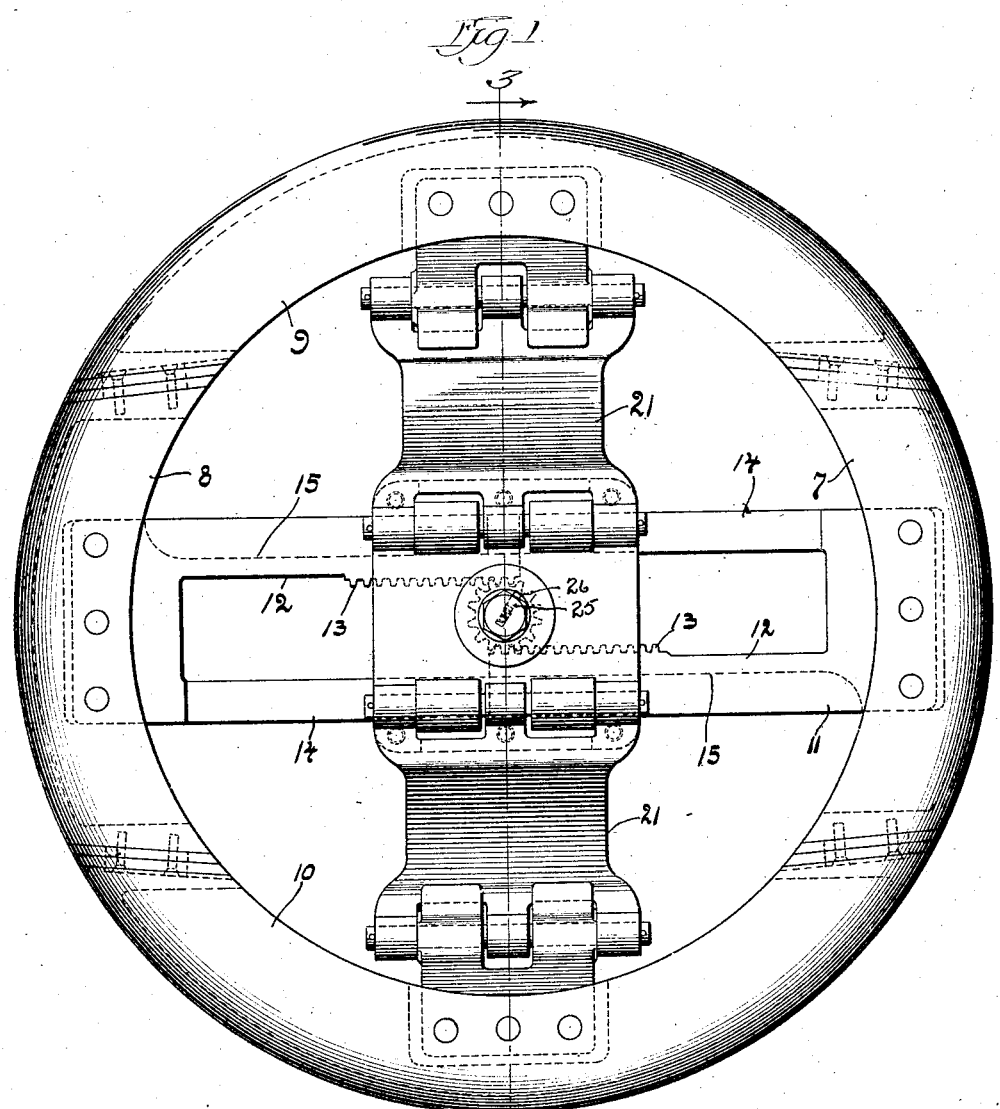
Witness:　　　　　Inventor
　　　　　　　　William C. Stevens

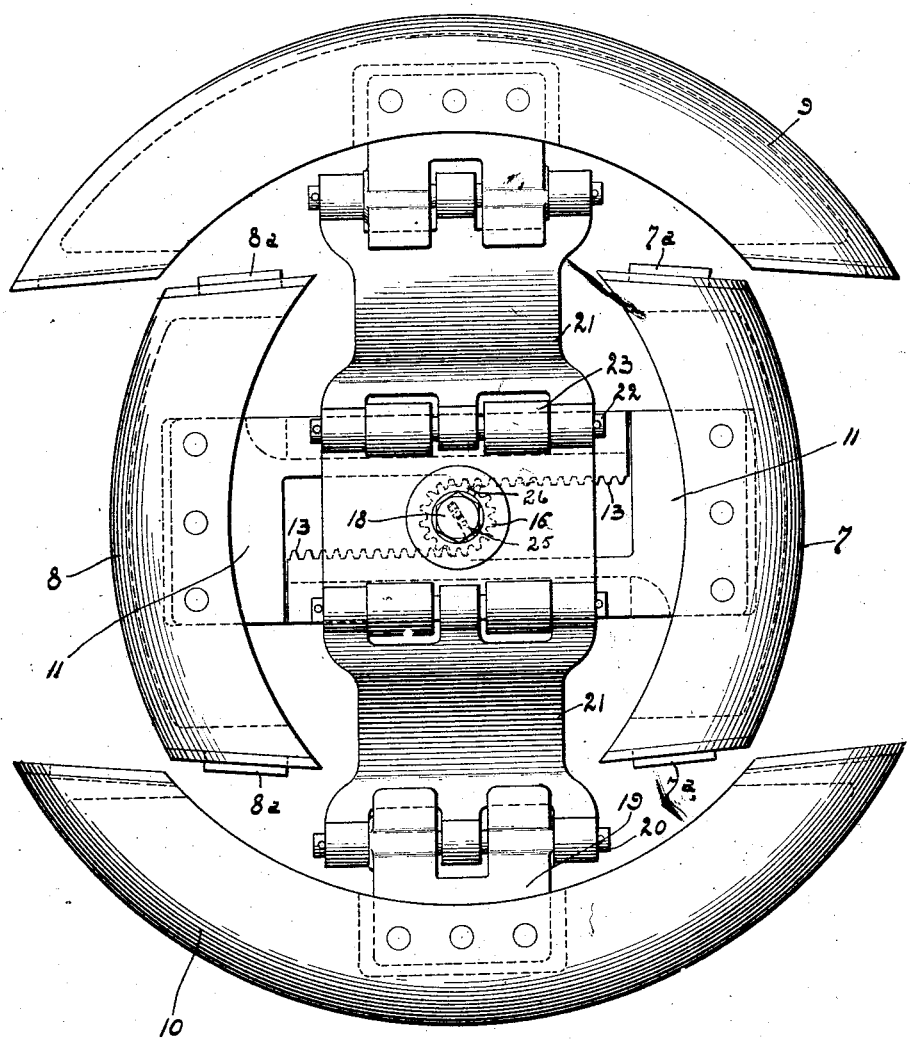

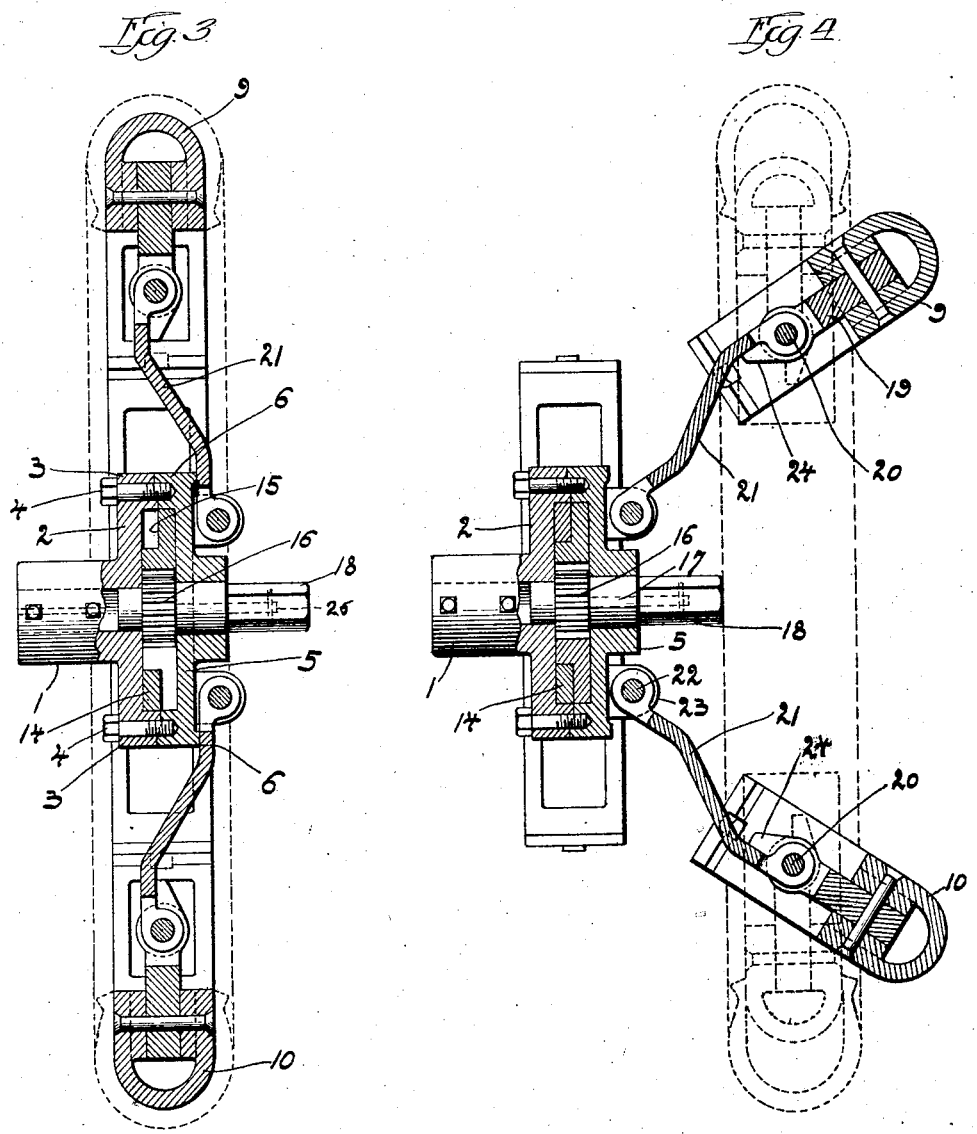

Patented Dec. 28, 1926.

1,612,786

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

COLLAPSIBLE TIRE CORE.

Application filed April 7, 1923. Serial No. 630,439.

This invention relates to cores such as used in the building or finishing of tire carcasses and particularly to that type of core in which the collapsing mechanism is permanently attached to the several core sections. The object of the present invention is to improve upon cores of this type, simplifying the construction and operation of the core so as to render it easy to manufacture and to operate.

These and other objects will be apparent from a description of the invention obtained from an inspection of the drawing and the specification for same, it being understood that while the showing is detailed so as to afford a clear understanding of the invention, the details are not essential and may be varied within the scope of the invention as defined by the claims appended hereto.

In the drawings:

Figure 1 is a side elevation of the improved core in assembled condition;

Figure 2 is a similar view showing the core partially collapsed;

Figure 3 is a section on the line 3—3 of Figure 1; and

Figure 4 is a section showing the core collapsed.

The core differs from other cores of a similar type in that certain of its sections are moved inwardly on radial lines until within the perimeter of the beads and their intermediate sections are folded or swung outwardly until the tire has been freed therefrom. By so constructing and operating the core it is possible to make a simpler and more easily operated core than prior types of cores of this general nature.

In the drawings 1 represents the hub of the core, which is designed to be secured to the end of the shaft of a tire building machine or stand. From this hub extends a plate 2 which is generally rectangular in cross-section, being provided with oppositely positioned side flanges 3. To this plate is secured by bolts 4 a cover plate 5, parallel edges of which are provided with flanges 6 seated over the flanges 3.

The core is shown in Figure 1 and it will be seen that it comprises four sections, of which the sections 7 and 8 are tapered outwardly to constitute key sections and the sections 9 and 10 are intermediate sections. The key sections are provided with keys 7$^a$ and 8$^a$ which fit in corresponding slots in sections 9 and 10 and the key sections are withdrawn first in collapsing the core and this is performed by means of rack plates 11. These plates are fastened rigidly to the central portion of the key sections and each plate comprises a bifurcated member, one arm 12 of which is formed on its inner surface with a rack 13. The other arm 14 of the rack plate is somewhat smaller and as the arms are placed in opposite relationship the arm 14 of one rack bar is received in a groove 15 in the other rack bar.

The racks 13 face each other and between and in mesh with them is an operating pinion 16 which is carried on a short shaft 17 journaled in the hub 1 and in the plate 5. The shaft is provided with a hexagon head 18 which is adapted to be engaged by a suitable wrench, so that when the shaft is rotated the racks are moved toward or away from the center of the core.

The intermediate sections 9 and 10 are provided with rigid arms 19 which are pivoted at 20 to links 21 which are in turn pivoted, as at 22, to ears 23 on the face of the cover plate 5. Lugs 24 are formed on the arms 19 which are adapted to engage the links 21 and limit the swinging movement of the sections 9 and 10 as illustrated in Figure 4.

In operating the core, it may be used as a finishing core, in which case the sides may be parallel as shown in Figures 3 and 4, or as a building core, in which latter case the core will have a cross-section similar to the usual core. When the core is to be collapsed, the operator rotates the shaft 17, withdrawing the key sections. He can then, by folding the sections as indicated in Figure 4, withdraw the other sections. By the provision of the two hinge points, as 20 and 22, the last sections may be moved inwardly in a straight line until freed of the tire.

It is obvious that, while the description has been detailed, embodiments of the invention may be made in other forms without departing from the essential features of the invention.

If desired, a spring held key 25 may be provided upon the shaft 17, which is adapted to engage a notch 26 in the plate 5 to hold the core in expanded position. The key is depressed by the wrench which is used for collapsing the core.

What I claim is:

1. In a collapsible core construction, the combination of a pair of oppositely positioned key sections, means substantially within the plane of the core to move the key sections toward and from the center of the core, and intermediate core sections mounted so as to be capable of swinging toward and from the axis of the core.

2. In a collapsible core construction, the combination of a pair of oppositely positioned key sections, means to move the key sections toward and from the center of the core, and intermediate core sections mounted on pivots substantially within the plane of the core so as to be capable of swinging toward and from the axis of the core.

3. In a collapsible core construction, the combination of a pair of oppositely positioned key sections, means substantially within the plane of the core to move the key sections toward and from the center of the core, intermediate core sections, and a hinged link normally lying substantially within the core plane and connecting each intermediate section with the center of the core.

4. In a collapsible core construction, the combination of a pair of oppositely positioned key sections, means to move the key sections in straight lines toward and from the center of the core, a central bearing plate at the axis of the core, and double pivoted links connecting the central bearing plate and the intermediate core sections.

5. In a collapsible core construction, the combination of oppositely disposed key sections, bars connected to the key sections, a central plate at the axis of the core in which said bars are slidably mounted, and a link pivoted to the central plate and also pivoted to an intermediate core section.

6. In a collapsible core construction, the combination of key sections, bars connected to said key sections to guide same toward and from the center of the core, and intermediate sections located between the key sections and having pivotal connections at the center of the core.

7. In a collapsible core construction, the combination of key sections, means to guide the key sections toward and from the center of the core, intermediate core sections, and links between the center of the core and the intermediate sections, said links being pivoted at both ends to permit the intermediate sections to swing outwardly from the core plane while remaining parallel thereto.

8. In a collapsible core construction, a sectional core, a central bearing plate at the axis of the core, and double pivoted connections between the central bearing plate and certain of the core sections, whereby the said sections may be moved in an arc toward the axis of the core while maintaining parallelism with the axis of the core.

WILLIAM C. STEVENS.